(12) United States Patent
Mercantonio

(10) Patent No.: US 11,473,570 B2
(45) Date of Patent: Oct. 18, 2022

(54) MASS SHIFTING MECHANISM BETWEEN TWIN EQUILIBRIUM POINTS, AND ELECTRO-PUMP OR ELECTRO-VALVE HAVING SUCH SHIFTING MECHANISM

(71) Applicant: CEME S.P.A., Trivolzio (IT)

(72) Inventor: Vincenzo Mercantonio, Carbonate (IT)

(73) Assignee: CEME S.P.A., Trivolzio (IT)

( * ) Notice: Subject to any disclaimer, the term of this patent is extended or adjusted under 35 U.S.C. 154(b) by 140 days.

(21) Appl. No.: 16/955,591

(22) PCT Filed: Dec. 21, 2017

(86) PCT No.: PCT/IT2017/000290
§ 371 (c)(1),
(2) Date: Jun. 18, 2020

(87) PCT Pub. No.: WO2019/123493
PCT Pub. Date: Jun. 27, 2019

(65) Prior Publication Data
US 2020/0340465 A1 Oct. 29, 2020

(51) Int. Cl.
*H02K 33/12* (2006.01)
*F04B 35/04* (2006.01)
*F04B 17/04* (2006.01)
*H02K 33/16* (2006.01)

(52) U.S. Cl.
CPC .......... *F04B 35/045* (2013.01); *F04B 17/04* (2013.01); *H02K 33/12* (2013.01); *H02K 33/16* (2013.01)

(58) Field of Classification Search
CPC .... H02K 7/1884; H02K 7/1876; H02K 33/12; H02K 33/16; F02B 71/06; F02B 63/041; F02B 71/04; F04B 35/045; F04B 17/04

USPC .......... 310/30, 15, 14, 12.17, 35, 34, 12.23, 310/12.12; 417/11, 56, 258, 398–403
See application file for complete search history.

(56) References Cited

U.S. PATENT DOCUMENTS

| | | | | |
|---|---|---|---|---|
| 4,142,485 A | * | 3/1979 | Moiroux | F04B 31/00 417/364 |
| 4,253,493 A | * | 3/1981 | English | F16K 31/082 137/625.5 |
| 4,454,426 A | * | 6/1984 | Benson | H02K 33/06 290/1 R |
| 4,541,787 A | * | 9/1985 | DeLong | H02K 41/02 417/418 |
| 4,692,673 A | * | 9/1987 | DeLong | F04B 17/046 310/34 |
| 5,440,183 A | * | 8/1995 | Denne | H02K 7/00 310/12.26 |
| 5,602,431 A | * | 2/1997 | Satomi | H02K 41/02 310/68 B |

(Continued)

FOREIGN PATENT DOCUMENTS

| | | |
|---|---|---|
| DE | 2826212 | 3/1979 |
| EP | 2894774 | 5/2017 |
| WO | 2004033868 | 4/2004 |

*Primary Examiner* — Maged M Almawri
(74) *Attorney, Agent, or Firm* — Pearne & Gordon LLP

(57) ABSTRACT

A mass shifting mechanism between twin equilibrium points comprises a movable slider between two equilibrium positions and actuating means active on the slider to bring it and keep it in a first and a second stationary spatial configuration through an action of electromagnetic field, the second stationary spatial configuration being different from the first stationary spatial configuration.

11 Claims, 2 Drawing Sheets

(56) References Cited

U.S. PATENT DOCUMENTS

Figure 1:
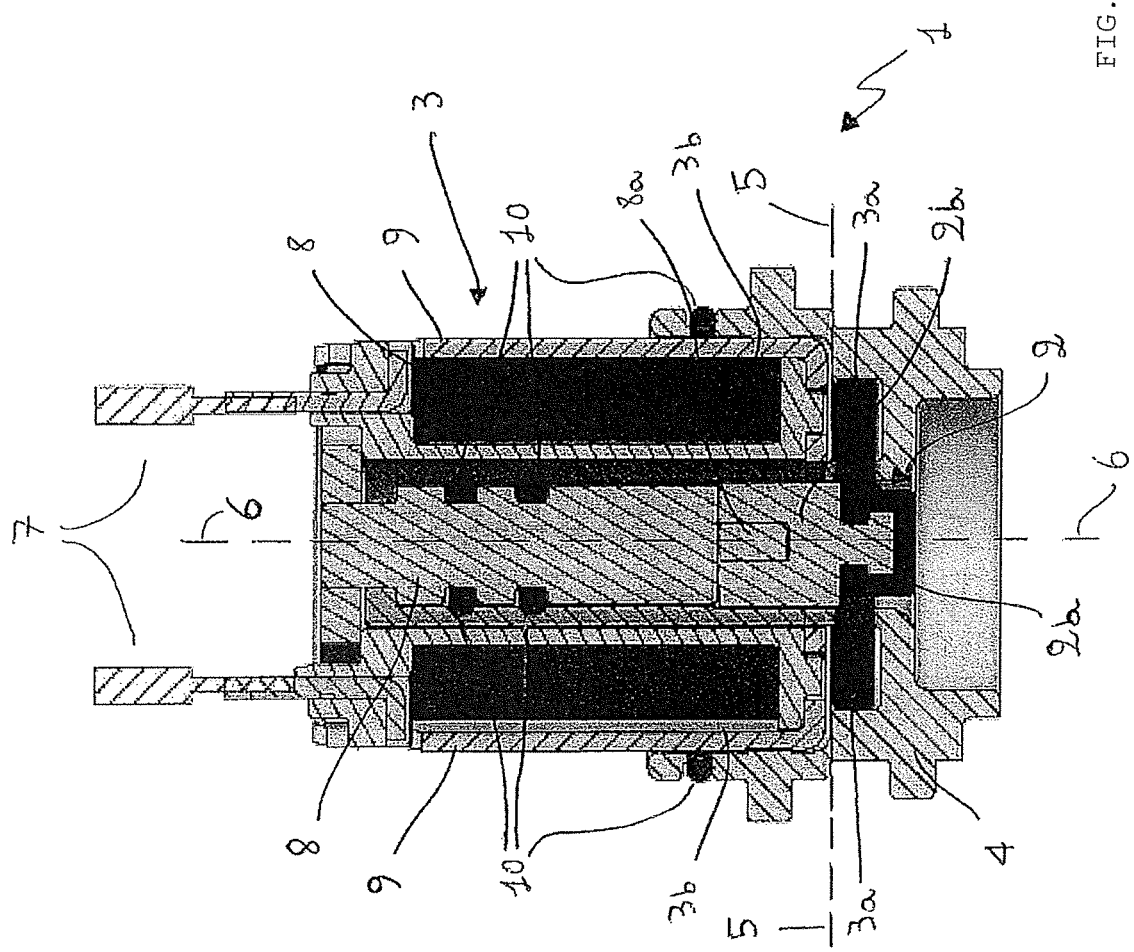

| | | | | |
|---|---|---|---|---|
| 5,691,582 A * | 11/1997 | Lucas | B21D 51/26 | 310/15 |
| 5,734,209 A * | 3/1998 | Hallidy | F04B 47/06 | 310/12.21 |
| 5,814,907 A * | 9/1998 | Bandera | H01F 7/1615 | 310/23 |
| 5,831,353 A * | 11/1998 | Bolding | F04B 17/046 | 417/418 |
| 5,833,440 A * | 11/1998 | Berling | F16K 31/082 | 417/418 |
| 5,896,076 A * | 4/1999 | van Namen | H01F 7/1615 | 335/229 |
| 5,965,964 A * | 10/1999 | Skinner | H02K 7/1876 | 310/15 |
| 6,323,567 B1 * | 11/2001 | Hazelton | H02K 41/03 | 310/12.33 |
| 6,336,326 B1 * | 1/2002 | Conrad | F28D 7/103 | 60/524 |
| 6,608,408 B1 * | 8/2003 | Denne | H02K 41/031 | 310/34 |
| 6,748,907 B2 * | 6/2004 | Malmquist | B60L 50/40 | 123/46 E |
| 7,001,158 B2 * | 2/2006 | Dunn | F04B 49/065 | 417/415 |
| 7,082,909 B2 * | 8/2006 | Graf | F02B 71/04 | 123/46 E |
| 7,201,746 B2 * | 4/2007 | Olsen | A61M 5/14276 | 604/288.01 |
| 7,318,506 B1 * | 1/2008 | Meic | F02B 75/048 | 123/46 R |
| 7,378,765 B2 * | 5/2008 | Iwasa | H02K 41/03 | 318/135 |
| 7,750,513 B2 * | 7/2010 | Witte | H02K 55/00 | 310/12.24 |
| 7,768,159 B2 * | 8/2010 | Okada | H02K 41/031 | 310/12.24 |
| 7,898,121 B2 * | 3/2011 | Ramsay | H02K 41/031 | 74/473.23 |
| 7,946,025 B2 * | 5/2011 | Lindberg | F16C 32/0472 | 29/592.1 |
| 8,097,987 B2 * | 1/2012 | Chao | H02K 41/03 | 310/12.33 |
| 8,125,093 B2 * | 2/2012 | Hyde | B60L 50/40 | 290/1 R |
| 8,196,402 B2 * | 6/2012 | Wood | H02K 7/1892 | 60/524 |
| 8,449,274 B1 * | 5/2013 | Zelechonok | F04B 17/04 | 417/419 |
| 8,726,857 B2 * | 5/2014 | Wood | F02D 39/10 | 123/3 |
| 9,328,839 B2 | 5/2016 | Arend et al. | | |
| 9,890,871 B2 * | 2/2018 | Liang | H01F 7/1615 | |
| 2001/0033110 A1 * | 10/2001 | Pulford, Jr. | H02K 15/03 | 310/12.17 |
| 2002/0176790 A1 * | 11/2002 | Akazawa | F04B 35/045 | 417/417 |
| 2003/0024492 A1 * | 2/2003 | Malmquist | F02B 71/04 | 123/46 E |
| 2003/0034697 A1 * | 2/2003 | Goldner | F16F 15/03 | 310/15 |
| 2005/0023905 A1 * | 2/2005 | Sakamoto | H02K 33/16 | 310/12.17 |
| 2005/0077787 A1 * | 4/2005 | Qiu | H02K 35/06 | 310/12.25 |
| 2005/0081804 A1 * | 4/2005 | Graf | F02B 71/04 | 903/905 |
| 2005/0100454 A1 * | 5/2005 | Meucci | F04B 9/133 | 417/396 |
| 2005/0103287 A1 * | 5/2005 | Hofbauer | F04B 17/05 | 123/46 E |
| 2005/0162034 A1 * | 7/2005 | Soghomonian | H01F 1/1475 | 310/67 R |
| 2006/0021589 A1 * | 2/2006 | Jacobsen | F02B 71/04 | 123/46 R |
| 2006/0124083 A1 * | 6/2006 | Niiyama | F02B 63/04 | 123/46 R |
| 2006/0171822 A1 * | 8/2006 | Seagar | F04B 35/045 | 417/258 |
| 2006/0181158 A1 * | 8/2006 | Tajima | H02K 41/03 | 310/12.25 |
| 2007/0108850 A1 * | 5/2007 | Chertok | H02K 33/16 | 310/15 |
| 2009/0091195 A1 * | 4/2009 | Hyde | H02K 7/1884 | 310/16 |
| 2009/0101005 A1 * | 4/2009 | Pohl | F01B 11/007 | 92/143 |
| 2009/0200126 A1 * | 8/2009 | Kondo | F16F 9/535 | 29/896.93 |
| 2010/0263765 A1 * | 10/2010 | Spangenberg | C23C 8/02 | 148/210 |
| 2010/0277012 A1 * | 11/2010 | Kobayashi | H02K 7/1884 | 310/30 |
| 2011/0000206 A1 * | 1/2011 | Aprad | F24V 99/00 | 165/45 |
| 2011/0025138 A1 * | 2/2011 | Chao | H02K 41/03 | 310/12.29 |
| 2011/0104476 A1 * | 5/2011 | Toyoda | H01F 1/33 | 428/407 |
| 2011/0221206 A1 * | 9/2011 | Milinkovic | F01K 13/00 | 60/660 |
| 2012/0175974 A1 * | 7/2012 | Robertson | H01F 7/1646 | 310/12.26 |
| 2012/0279234 A1 * | 11/2012 | Aigouy | F04B 35/045 | 310/12.04 |
| 2012/0280513 A1 * | 11/2012 | Cockerill | F02B 63/04 | 290/1 A |
| 2013/0167794 A1 * | 7/2013 | Svrcek | F16J 1/09 | 123/193.2 |
| 2013/0342036 A1 * | 12/2013 | Akazawa | H02K 35/04 | 310/28 |
| 2015/0192218 A1 * | 7/2015 | Arend | F16K 31/0679 | 310/38 |
| 2015/0369237 A1 * | 12/2015 | Ahn | F04B 39/122 | 417/564 |
| 2017/0074418 A1 * | 3/2017 | Liang | H01F 27/28 | |
| 2017/0254438 A1 * | 9/2017 | Ulbricht | F16K 31/0679 | |
| 2019/0048787 A1 * | 2/2019 | Baeuerle | F04B 35/045 | |

* cited by examiner

MASS SHIFTING MECHANISM BETWEEN TWIN EQUILIBRIUM POINTS, AND ELECTRO-PUMP OR ELECTRO-VALVE HAVING SUCH SHIFTING MECHANISM

The present invention relates to a mechanism for shifting a mass from/to two points of positional equilibrium, and further relates to different possible practical implementations of this mechanism in items or products such as, for example, closing or control valves in hydraulic/pneumatic circuits or pumps/motors which can be always adapted to such hydraulic/pneumatic circuits.

As is known, the management—as well as the creation—of flows in hydraulic or pneumatic circuits refers first and foremost to "motor" devices (commonly referred to as pumps, which in turn may be driven by different forms of energy) and to "control" devices (among which the opening/closing, control or deviation valves): such devices are therefore needed to change the functional states of machinery by moving and directing the flow of the fluid in it.

Usually, the known valves or pumps need electric power to operate: such electric power is used to induce variations in an electromagnetic field, and such variations are used to move inductively a magnetically sensitive mass in this same variable electromagnetic field: through this basic physical phenomenon it is possible to implement, for example, the so-called solenoid valves or even the vibration pumps.

The magnetically sensitive masses moved through electromagnetic induction are subjected to dynamically alternate forces: the magnetic force causes movements toward a direction (such movements are usually delimited by suitable degrees of constraint acting on the moving mass), while there are mechanical contrast systems for "reversible" movements in the opposite direction, typically acting by means of equivalent springs and mechanical elements, or through pressure difference, which bring back the mass to its starting position.

The main problems of the prior art are actually due to the presence of the mechanical contrast means, which by their very nature involve taking up space and generate effects of static and "dynamic" interference (friction, elastic hysteresis, expansions and deformations in unwanted directions, sensitivity to temperature, wear due to sliding or rolling friction and so on), which result in a limitation of the dynamic performances of the product, in a limited duration of the product and in higher production and maintenance costs of the product in which they are contained from the structural and functional point of view.

The present invention therefore intends to design a "bistable" (i.e. capable of shifting and maintaining for an arbitrarily defined time period in at least two distinct positions) mechanism for shifting a given mass in two equilibrium positions in the space, and, accordingly, has as its object to provide products to be used in hydraulic or pneumatic circuits (such as electro-actuated valves and pumps), which advantageously exploit such shifting mechanism and are therefore able to overcome the above mentioned drawbacks of the prior art.

It is a further object of the present invention to provide a shifting mechanism that may advantageously be integrated in several other types of product or, in other words, "functional module", in order to ensure further room for manoeuvre as regards the accuracy and reliability (and, broadly, the performances) of these products.

The mentioned technical task and the specified aims are substantially achieved by a shifting mechanism between twin equilibrium points having the characteristics mentioned in one or more of the appended claims, and in any case disclosed hereinafter.

Figure 3:
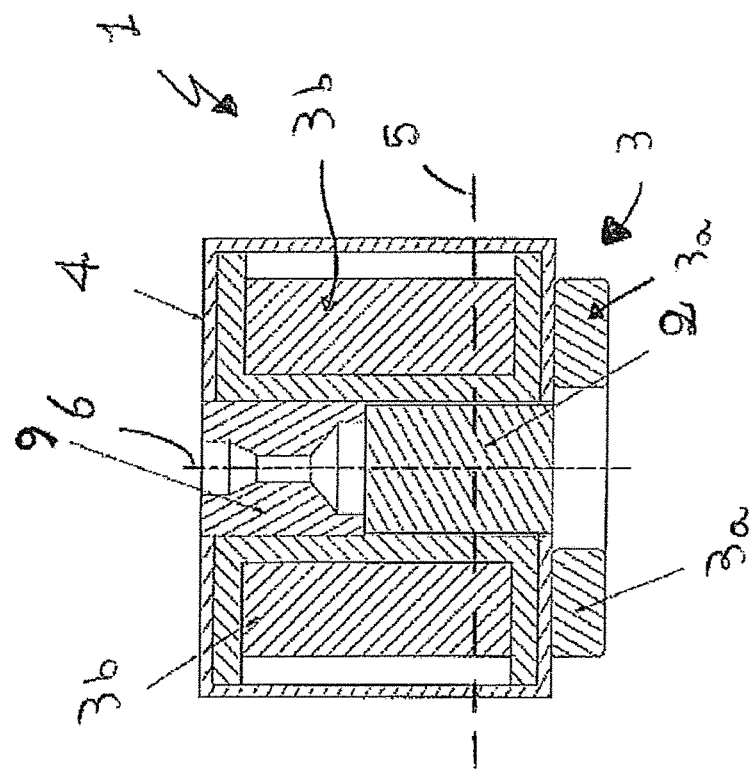
Figure 2:
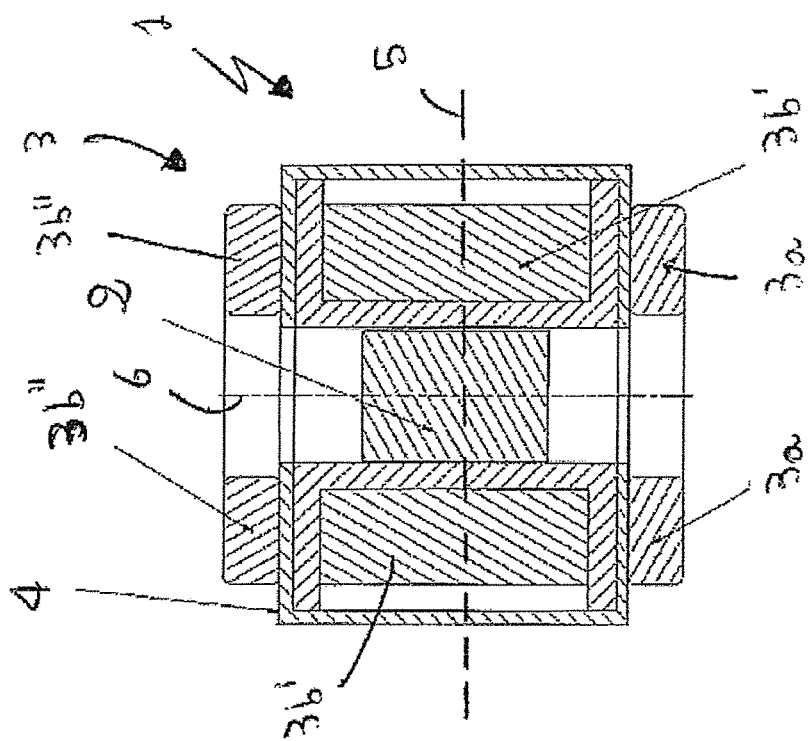

By way of non-limiting example it is set forth the disclosure of a preferred but not exclusive embodiment of a mechanism according to the invention, which is shown in the appended figures, wherein:

FIG. 1 shows a schematic sectional view of a valve which incorporating the mechanism according to the invention; and FIGS. 2 and 3 show schematic sectional views of two possible embodiments of the mechanism according to the invention.

With reference to the appended figures, the mechanism according to the present invention comprises a slider element 2 reversibly movable between two equilibrium positions (which will be further detailed hereinafter) and suitable actuating means 3 active on the slider element 2 to bring it and keep it in at least a first stationary spatial configuration by means of an action of the electromagnetic field.

Advantageously, in the present invention the actuating means 3 are selectively active on the slider element 2 also to (reversibly and selectively) bring and maintain it in at least one second stationary spatial configuration other than the first stationary spatial configuration.

At this point, it should be noticed the difference between the invention and the known shifting devices between twin equilibrium points: in the latter, indeed, one of the two stationary spatial configurations is reached (and maintained) through the persistent action of an electromagnetic field and, vice versa, the other spatial configuration is reached as a result of the fact that mechanical elements—typically, elastic springs—prevail when the electromagnetic field is removed, whereas in the present invention both stationary spatial configurations are reached and maintained as a function of the individual presence/coexistence of one or two electromagnetic fields.

Still more specifically, according to the invention, a first spatial configuration of the slider element 2 is related to the presence of a single electromagnetic field, while the other occurs when to the available magnetic field is vectorially "added" a further electromagnetic field, which through the effect of the new balance of forces acting on the slider element itself brings it stably in the second stationary spatial configuration. From the functional point of view, the second stationary spatial configuration is maintained as long as there is the second electromagnetic field: when the latter is removed, the effect of the first electromagnetic field prevails again by bringing the slider element 2 back to the first stationary spatial configuration.

The complete absence of mechanical return and/or contrast means in the mechanism 1 allows a very high actuation speed and practically is not subject to issues of wear or ageing of the materials, since there are not mechanical parts in motion (except the slider element).

In more detail, it can be seen that the slider element 2 is reversibly and alternatively movable between the first and the second stationary spatial configuration, and for this purpose the actuating means 3 are suitable to generate an electromagnetic field defining at least two positions of stable equilibrium which may be occupied by the slider element 2 itself.

Conveniently, such two stable equilibrium positions are located with respect to a base body 4 in which the mechanism 1 is at least partially contained/housed.

Still on the subject of the "placement" of the main functional elements of the invention, it should also be noted that the overall electromagnetic field (or, in other words, the magnetic field resulting from the vectorial sum of the two magnetic fields which may be selectively summed or alternated to each other) generated by the actuation means 3 comprises two spatial portions respectively opposite to an ideal separation plane 5: these two opposite spatial portions can conveniently be asymmetrical with respect to the ideal separation plane 5, so that the slider element 2 can be located with the utmost arbitrariness according to the design conditions of the mechanism 1.

With regards to the possibility of generating the electromagnetic field (or, even better, its various overall forms resulting from vectorial sums of two "partial" electromagnetic fields), it is noted that the actuation means comprise a first electromagnetic field generation element 3a suitable to generate a first portion of the electromagnetic field in a first half-space defined by the ideal separation plane 5 (and, typically, this first portion of the electromagnetic field is stable in space and/or constant in time) and a second electromagnetic field generation element 3b suitable to generate a second portion of the electromagnetic field in a second half-space defined by the ideal separation plane 5 opposite to the first half-space (this second portion of the electromagnetic field is instead variable in space and/or time, and may be therefore vectorially added to the stable and/or stationary portion of field generated by the element 3a).

As a function of the various possible vectorial sums of the two portions of the electromagnetic field described above, the first stationary spatial configuration of the slider element 2 is located in the first portion of the electromagnetic field (or more precisely, in a position of the half-space to which the first portion of the electromagnetic field geometrically belongs), whereas the second stationary spatial configuration of the slider element 2 is located in the second portion of the electromagnetic field (or more precisely, in a position of the half-space to which the second portion of the electromagnetic field geometrically belongs).

By suitably selecting the shape of the generation elements 3a and/or 3b, it is possible to consequently mould the electromagnetic field and its two constitutive portions: e.g., the first and the second portion of the electromagnetic field can advantageously have a toroidal conformation in half-spaces opposite to the ideal separation plane 5, and respectively define:

a first and a second average radius with respect to an ideal shrink-fit axis 6 perpendicular to the ideal separation plane 5; and a first and a second development depth extending in opposite directions along said ideal shrink-fit axis.

Still as a function of the various conformation and/or energy supply possibilities of the generation elements 3a and/or 3b, the above mentioned average radii and the above mentioned development depths can be different from each other: in the appended figures, for example, it can be seen that the first development depth (i.e., the one of the portion of the magnetic field generated by the element 3a) is smaller than the second development depth (i.e., that portion of the magnetic field generated by the element 3b).

Still with reference to the figures appended hereto, it should be noted that the first and second stationary configuration of the slider element 2 are positioned on the shrink-fit axis 6 and are located in half-planes opposite with respect to the ideal separation plane 5 at typically different distances (in the case described herein, these positions abut near the first or second development depth, which in turn can be considered as "length".

As already partially mentioned previously, the actuating means 3 comprise:

a first electromagnetic field generator 3a composed of a body made of a magnetically permanent material; and a second electromagnetic field generator 3b suitable to selectively generate an electromagnetic field variable in time.

In more detail and with reference to the figures, the first electromagnetic field generator 3a may conveniently be a coaxial permanent magnetic toroid around the shrink-fit axis 6 (which can be made of, e.g., is made of, rare earth and/or cobalt-samarium alloy permanent magnets), whereas the second electromagnetic field generator 3b comprises at least a toroid made of a coaxial magnetically excitable material (functionally, this material being paramagnetic or ferromagnetic) around the shrink-fit axis 6.

Even in more detail, in FIG. 2 it can be seen that the second electromagnetic field generator 3b may comprise both an electrically excitable coil or solenoid (indicated by 3b' in the figure and contained within the base body 4) and a further permanent magnetic toroid (indicated by 3b" in the figure and positioned outside the base body 4).

In order to generate the variable portion of the electromagnetic field, in the mechanism 1 there are suitable electro-inductive supply means 7 selectively activated on the above mentioned toroid made of magnetically excitable material (typically, these electro-inductive supply means 7 comprise at least an excitation electrical circuit), and there are also suitable means for closing the magnetic circuit 8 magnetically connected to the toroid, which is made of magnetically excitable material, and, in turn, are made of magnetically excitable material.

In more detail, the means for closing the magnetic circuit 8 comprise an axial body positioned along the shrink-fit axis 6 and comprising an engagement protrusion 8a extending towards the slider element 2.

Being structurally and functionally coupled to the means for closing the magnetic circuit 8, the slider element 2 comprises a body made of magnetically sensitive material slidable along the shrink-fit axis 6: such body made of magnetically sensitive material defines an abutment and closing surface 2a and a selective engagement surface 2b positioned opposite to the abutment and closing surface 2a as well as counter-shaped to said engagement protrusion 8a.

The above mentioned base body 4 can be coupled, in terms of the containment function of the whole mechanism 1, to a main body 9, which may actually be the body of a valve or of a pump (and typically may be considered solenoid electro-valves or oscillating slider electro-pumps).

Conveniently, the main body 9 (possibly in combination with the base body 4) defines the shrink-fit axis 6, which, as already seen and evident in the exemplary figures, constitutes a movement axis in an alternate direction to the slider element 2.

When mechanism 1 is used in pumps or valves, and therefore it is needed to ensure suitable barriers against fluid leaks, the invention may comprise means for hydraulic and/or pneumatic sealing 10 interposed between the main body 9 and the mechanism 1 and/or interposed between the slider element 2 and the mechanism 1 and/or, more broadly, interposed between at least two mechanically contiguous structural components, belonging to the mechanism 1 itself.

The invention achieves several advantages.

Firstly, thanks to the peculiar structural architecture of the present mechanism (and, consequently, thanks to the derivative structural architecture which may be made in the electro-valves or electro-pumps equipped with this same mechanism), it is possible to operate with very high precision, actuation frequency and selection of the "strokes" of the actuator, thus providing a wide variability of movements that can then be used in the various situations of occlusion/opening, control or creation of hydraulic or pneumatic flows.

At the same time, the peculiar mode of cooperation of the various structural components of the present invention ensures an optimal control of both performances and industrial costs, avoiding many drawbacks due to the mechanical actions (and counter-actions) and relying on the typical phenomenology of the interactions of the electromagnetic field . . . this field being able to be generated and controlled with less moving mechanical parts than in an electro-actuated mechanism with known elasto-mechanical contrasts.

Nevertheless, the versatility of the present invention must be considered in two respects, which are equally advantageous and may be combined together: one aspect is linked to the possibility of obtaining very compact internal architectures of valves or pumps with fewer design and manufacturing complications, while the other aspect relates to the possibility to extend this functional concept to different sizes and also to applications that are not directly connected to electro-valves or electro-pumps.

Finally, it should be noted that the present invention allows to maintain low production costs of the mechanism (as well as of the products which contain it) and also allows to obtain a high operating life: this makes possible to have an highly efficient industrial process with very swift amortization, thus generating a further reduction in costs and a consequent increase in profitability.

The invention claimed is:

1. Mass shifting mechanism between twin equilibrium points, comprising:
    a slider element (2) reversibly movable between two equilibrium positions; and
    actuating means (3) active on said slider element (2) to bring it and keep it in at least a first stationary spatial configuration through an action of electromagnetic field, said actuating means (3) being selectively active on the slider element (2) also for bringing and maintaining reversibly the slider element (2) itself in at least a second stationary spatial configuration other than said first stationary spatial configuration, said actuating means comprising:
    a first element (3a) generating an electromagnetic field suitable to generate a first portion of the electromagnetic field, said first portion of electromagnetic field being stable in space and/or constant in time; and
    a second element (3b) generating an electromagnetic field suitable to generate a second portion of the electromagnetic field, said second portion of the electromagnetic field being variable in space and/or time, the first stationary spatial configuration of the slider element (2) being located in said first portion of the electromagnetic field and the second stationary spatial configuration of the slider element (2) being located in said second portion of the electromagnetic field, said second element (3b) generating an electromagnetic field comprising at least one coaxial permanent magnetic toroid around a shrink-fit axis (6), wherein:
    said permanent magnetic toroid consisting of permanent magnets made of cobalt-samarium alloys;
    said first and second portions of the electromagnetic field respectively lying in a first half-space and in second half-space opposite to said first half-space with respect to an ideal separation plane;
    the actuating means (3) are suitable to generate an electromagnetic field defining at least two stable equilibrium positions which may be occupied by the slider element (2), said two stable equilibrium positions being localized with respect to a base body (4) in which the mass shifting mechanism (1) is at least partially contained; and
    said first element (3a) and said second element (3b) are symmetrical with respect to the shrink-fit axis (6) and said first element (3a) and said second element (3b) are asymmetrical with respect to each other and an ideal separation plane (5), such that said electromagnetic field generated by the actuating means (3) comprises two spatial portions respectively opposite with respect to said ideal separation plane (5), said opposite spatial portions being asymmetrical with respect to said ideal separation plane (5).

2. The mass shifting mechanism according to claim 1, wherein the slider element (2) is reversibly and alternatively movable between the first stationary spatial configuration and said second stationary spatial configuration.

3. The mass shifting mechanism according to claim 1, wherein the first and the second portion of electromagnetic field have toroidal conformation in opposite half-spaces with respect to the ideal separation plane (5).

4. The mass shifting mechanism according to claim 1, wherein the first and second toroidal portion of electromagnetic field define respectively:
    a first and a second average radius with respect to an ideal shrink-fit axis (6) perpendicular to the ideal separation plane (5); and
    a first and a second development depth extending in opposite directions along said ideal shrink-fit axis, the first development depth being smaller than the second development depth.

5. The mass shifting mechanism according to claim 1, wherein the first and the second stationary configuration of the slider element (2) are positioned on the shrink-fit axis (6) and are located on opposite half-planes with respect to the ideal separation plane (5), at different distances.

6. The mass shifting mechanism according to claim 1, wherein the actuating means (3) comprise:
    a first electromagnetic field generator (3a) composed of a body in a permanent magnetically material; and
    a second electromagnetic field generator (3b) suitable to selectively generate an electromagnetic field variable in time.

7. The mass shifting mechanism according to claim 1, wherein the slider element (2) comprises a body of magnetically sensitive material slidable along the shrink-fit axis (6), said body of magnetically sensitive material defining an abutment and closing surface (2a) and a selective engagement surface (2b) positioned opposite to said abutment and closing surface (2a) as well as counter-shaped to said engagement protrusion (8a).

8. The mass shifting mechanism-according to claim 1, wherein a main body (9) containing the mechanism (1) is also present, said main body (9) being a body of a valve or a pump, said valve being a solenoid electro-valve or said pump being an oscillating slider electro-pump, the main body (9) defining the shrink-fit axis (6) and the slider element (2) being alternatively movable along the shrink-fit axis (6).

9. The mass shifting mechanism-according to claim 1, wherein means for hydraulic and/or pneumatic sealing (10) are also present, interposed between the main body (9) and the mechanism (1) and/or interposed between the slider element (2) and the mechanism (1) and/or interposed between at least two mechanically contiguous structural components, belonging to the mechanism (1).

10. The mass shifting mechanism according to claim 1, wherein the second electromagnetic field generator (3b) further comprises:
   means for electro-inductive supply (7) selectively activated on said toroid of magnetically excitable material, said means for electro-inductive supply (7) comprising at least one excitation electrical circuit; and
   means for closing the magnetic circuit (8) magnetically connected to the toroid of magnetically excitable material which are, in turn, made of magnetically excitable material.

11. The mass shifting mechanism according to claim 10, wherein said means for closing the magnetic circuit (8) comprise an axial body positioned along the shrink-fit axis (6) and comprising an engagement protrusion (8a) extending towards the slider element (2).

* * * * *